(12) United States Patent
Shinchi

(10) Patent No.: US 7,760,376 B2
(45) Date of Patent: Jul. 20, 2010

(54) PRINTING METHOD, PRINTING SYSTEM, PRINT SERVER, AND COMPUTER READABLE RECORDING MEDIUM ON WHICH PRINTING PROGRAM IS RECORDED

(75) Inventor: Toshimi Shinchi, Matsudo (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1174 days.

(21) Appl. No.: 10/422,780

(22) Filed: Apr. 25, 2003

(65) Prior Publication Data

US 2003/0202206 A1 Oct. 30, 2003

(30) Foreign Application Priority Data

Apr. 26, 2002 (JP) ............................. 2002-126899

(51) Int. Cl.
G06F 3/12 (2006.01)
(52) U.S. Cl. ..................... 358/1.15; 358/1.13; 709/227; 709/229; 709/230; 709/250; 719/321; 719/327
(58) Field of Classification Search ................ 358/1.13, 358/1.15; 709/227, 229, 230, 250; 719/321, 719/327
See application file for complete search history.

(56) References Cited

U.S. PATENT DOCUMENTS

| | | | |
|---|---|---|---|
| 6,552,813 B2 * | 4/2003 | Yacoub | 358/1.1 |
| 6,781,711 B1 * | 8/2004 | Rijavec et al. | 358/1.2 |
| 6,816,275 B1 * | 11/2004 | Aoki | 358/1.15 |
| 6,952,276 B2 * | 10/2005 | Sotokawa et al. | 358/1.15 |
| 7,046,391 B1 * | 5/2006 | Barry et al. | 358/1.9 |
| 7,196,713 B1 * | 3/2007 | Yamagishi | 347/116 |
| 2002/0030743 A1 * | 3/2002 | Inui | 348/195 |
| 2002/0101601 A1 * | 8/2002 | Parrish et al. | 358/1.14 |
| 2002/0101604 A1 * | 8/2002 | Mima et al. | 358/1.15 |
| 2002/0140971 A1 * | 10/2002 | Machida | 358/1.15 |
| 2003/0081243 A1 * | 5/2003 | Su | 358/1.15 |
| 2003/0117638 A1 * | 6/2003 | Ferlitsch | 358/1.13 |

FOREIGN PATENT DOCUMENTS

| | | |
|---|---|---|
| JP | 11-237964 | 8/1999 |
| JP | 2000-318268 | 11/2000 |

* cited by examiner

Primary Examiner—David K Moore
Assistant Examiner—Benjamin O Dulaney
(74) Attorney, Agent, or Firm—Buchanan Ingersoll & Rooney PC

(57) ABSTRACT

A printing method for a printing system having a plurality of image forming devices and a plurality of data transfer devices, includes a judgment step of judging whether image deficiency will occur in printing data transferred from the first data transfer device to the plurality of image forming devices, and a control step of providing control for transferring the data from the second data transfer device to the image forming device when it is judged in the judgment step that image deficiency will occur.

35 Claims, 15 Drawing Sheets

30

50

| PAGE | DATA SIZE (BYTES) | DATA TRANSFER SPEED (PPM) |
|---|---|---|
| 1 | 2459323 | 536 |
| 2 | 33568645 | 119 |
| 3 | 8754367 | 457 |
| 4 | 17239343 | 232 |
| ----- | ----- | ----- |
| 200 | 22485903 | 178 |
| ----- | ----- | ----- |
| 1000 | 14675456 | 273 |

PRINTING METHOD, PRINTING SYSTEM, PRINT SERVER, AND COMPUTER READABLE RECORDING MEDIUM ON WHICH PRINTING PROGRAM IS RECORDED

This application is based on Japanese Patent Application No. 2002-126899, filed on Apr. 26, 2002, the contents of which are hereby incorporated by reference.

BACKGROUND OF THE INVENTION

1. Field of the Invention

The present invention relates to a printing method, a printing system, a print server, and a computer readable recording medium on which a printing program is recorded. In particular, the invention relates to a printing method, a printing system, a print server, and a computer readable recording medium on which a printing program is recorded for using a plurality of image forming devices simultaneously in order to print more efficiently.

2. Description of the Related Art

There exist so-called office administration support service shops, where they receive print data from a client through recording medium such as a flexible disk or a network, and print it on paper using an image forming device such as a printer to provide the printed documents to the client. In order to print a large volume of documents in those shops, the work time can be shortened by means of using a plurality of printers in parallel. The method of using a plurality of printers for a single print job is called "Cluster Printing." In the cluster printing, a print server for controlling a plurality of printers will be used. Let us assume a case of a cluster printing system using four printers connected to a print server. For example, when this cluster printing system receives a job consisting of 1000 pages, it divides the job to four groups of page 1 through 250, page 251 through 500, page 501 through 750, and page 751 through 1000, and prints each group of 250 pages using the four printers individually in parallel. This reduces the time to complete the entire print job to ¼ of what would be required when only one printer is used.

In the mean while, it is necessary for the print server to transfer the print data to each printer in coordination with printing speed of the printers in the cluster printing system if the printers do not have sufficient memory capacities to store the entire print data.

In a cluster printing system, however, the data transfer speed of the print server has to be high enough in correspondence with the number of printers as the total printing speed increases with the number of printers used. As the total printing speed increases due to the use of multiple printers, it could happen that the data transfer speed to each printer lags the printers' printing speed (PPM (page per minute), which is the unit of printing speed (number of pages of the image data to be processed per minute), will also be used herein as the unit of data transfer speed).

As there is a limit to the reading speed of the hard disk, which is the image storage device of a print server, the larger the data size of image data per page is, the lower the data transfer speed (PPM) from the print server is, and vice versa. When the data size of the image data is large, the data transfer speed (PPM) from the print server becomes lower, and the data transfer speed from the printer may consequently be lower than the printing speed of the printers.

As a result, the larger the image data size is and the higher the number of printers to which the data has to be transferred is, the higher the probability is for the data transfer speed to the printer becoming lower than the printing speed of the printers. Therefore, there was a problem of causing deficiency in a printing image as the transfer of the image data for a page is not completed during the printing of a page.

SUMMARY OF THE INVENTION

It is an object of the present invention to provide a printing method, a printing system, a print server, and a computer readable recording medium on which a printing program is recorded for preventing image deficiency from being generated during image forming on multiple image forming devices.

According to an aspect of the invention, there is provided a printing method for a printing system having a plurality of image forming devices and a plurality of data transfer devices, comprising: a judgment step of judging whether image deficiency will occur in printing data transferred from a first data transfer device to the plurality of image forming devices; and a control step of providing control for transferring the data from a second data transfer device to the image forming device when it is judged in the judgment step that image deficiency will occur.

According to this invention, a page judged that it will cause image deficiency during printing, can be transferred to a printer via another data transfer device. Therefore, it is possible to prevent image deficiency from occurring during printing by means of securing a necessary data transfer speed and preventing the printing speed from exceeding the data transfer speed. Moreover, since there is no need of reducing the number of image forming devices for printing, the printing operation can be performed more efficiently from the standpoint of the overall system.

According to another aspect of the invention, there is provided a printing system comprising a plurality of image forming devices connected to be able to transfer data with each other, a first data transfer device and a second data transfer device, wherein the printing system is equipped with: a judging unit for judging whether image deficiency will occur in printing data transferred from a first data transfer device to the plurality of image forming devices; and a control unit for providing control for transferring the data to the second data transfer device and then to the image forming device from the second data transfer device when it is judged by the judgment unit that image deficiency will occur.

According to still another aspect of the invention, there is provided a print server for transferring data to a plurality of image forming devices for printing, comprising: a judging unit for judging whether image deficiency will occur in printing data transferred from a first data transfer device to the plurality of image forming devices; and a control unit for providing control for transferring the data from a second data transfer device to the image forming devices when it is judged by the judgment unit that image deficiency will occur.

According to a further aspect of the invention, there is provided a computer readable recording medium on which a printing program for transferring data from a plurality of data transfer devices to a plurality of image forming devices for printing is recorded, wherein the printing program causes a computer to execute a process comprising: an arithmetic step of calculating data transfer speed in transferring data from the first data transfer device to the plurality of image forming devices in the printing system; a comparison judgment step of comparing the data transfer speed calculated in the arithmetic step with the printing speed at the image forming devices in the system and judging whether image deficiency will occur in printing based on the comparison; and a control step of providing control for transferring the data of a page judged that it will cause image deficiency in the comparison judgment step to the second data transfer device and then to the image forming device from the second image data transfer device.

The objects, characteristics and properties of this invention other than those set forth above will become apparent from the description given herein below with reference to preferred embodiments illustrated in the accompanying drawings.

DETAILED DESCRIPTION OF THE PREFERRED EMBODIMENTS

The embodiments of this invention will be described below with reference to the accompanying drawings.

Figure 1:
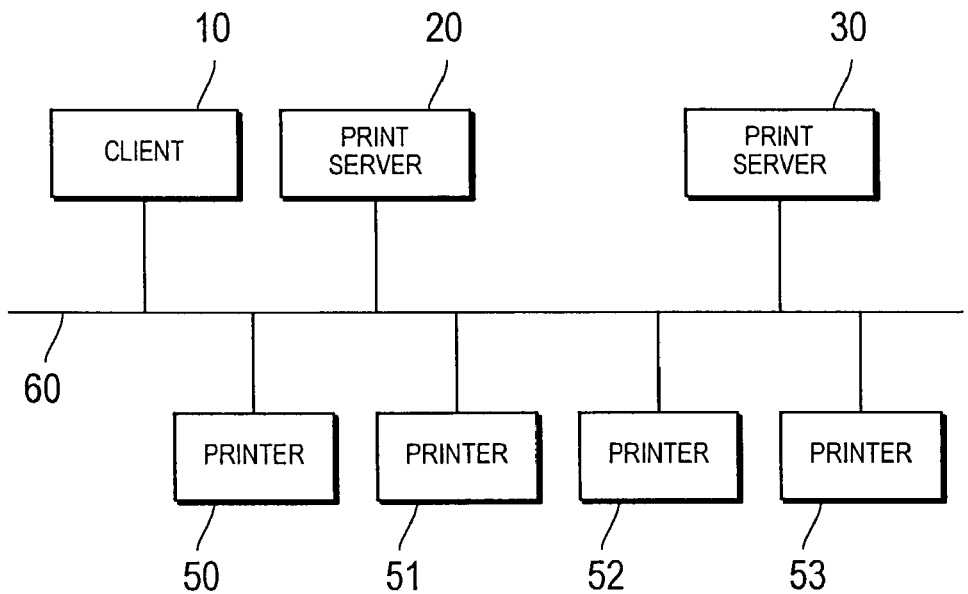
FIG. 1 is a total constitutional drawing of a printing system using print servers in accordance with the first embodiment of the present invention.

FIG. 1 is a total constitutional drawing of a printing system using print servers in accordance with the first embodiment of the present invention.

As shown in FIG. 1, the printing system includes a client 10, print servers 20 and 30, and a plurality of printers 50 through 53, all of which are interconnected to be able to communicate with each other via a network 60. The network 60 can be a LAN connecting computers and network equipment according to standards such as Ethernet®, Token Ring, and FDDI, or a WAN that consists of several LANs connected by a dedicated line.

A print job (a job generated by a printer driver based on various data such as document data generated using various kinds of application software, business form data supplied from a patterned business system, or image data generated using image processing software and the like) generated by a client 10 is transmitted to print server 20. Print server 20 converts the print job supplied by client 10 into image data (bitmap data), from which printers 50 through 53 can form images.

In this embodiment, print server 20 and printers 50 through 53 are connected via network 60, but the invention is not limited to it, but rather they can be connected via an interface according to such standard as IEEE 1394 without going through network 60.

Moreover, the types and the number of equipment to be connected to network 60 are not limited to those shown in FIG. 1. Although four printers are connected in this embodiment, the number of printers is not limited to four but can be any number. Moreover, other image forming device such as a facsimile machine, a copying machine, or a multi-function peripheral (MFP) can be used as well instead of a printer.

Next, constitution of each device mentioned above will be described below, but the description of a function common to multiple devices will be made only once when it appears and will not be repeated afterwards in order to avoid duplicate descriptions.

Figure 2:
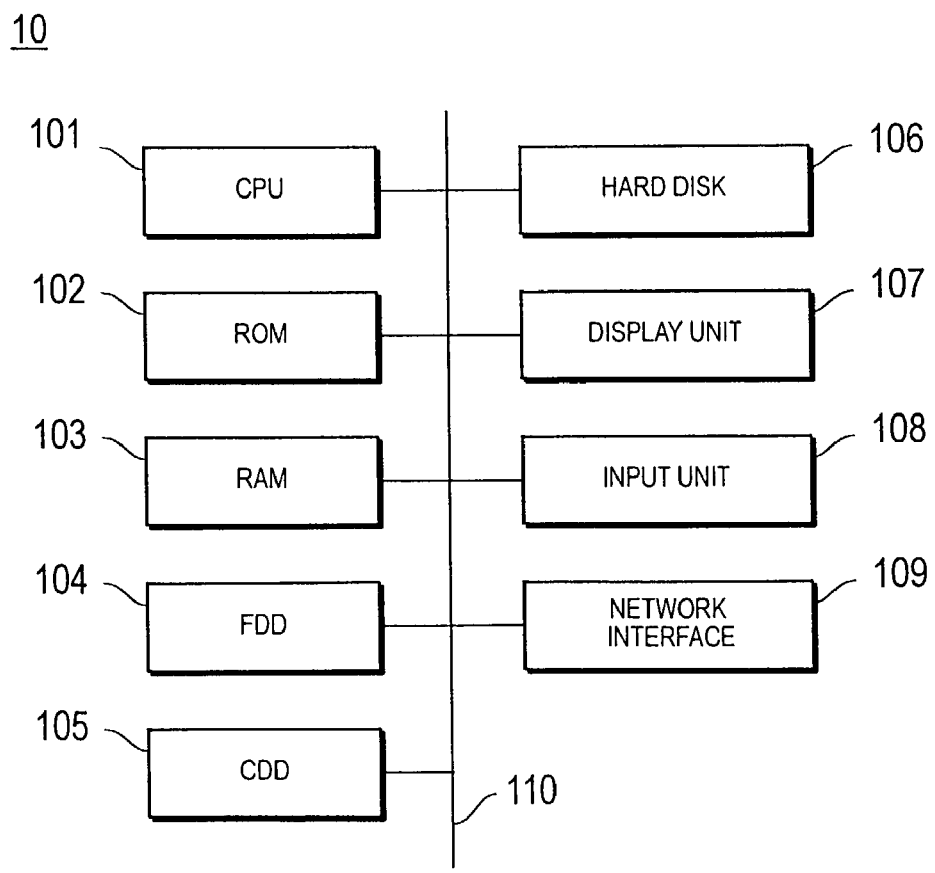
FIG. 2 is a block diagram showing the general constitution of a client.

FIG. 2 is a block diagram showing the general constitution of the client 10. The client 10 is typically a normal personal computer.

As shown in FIG. 2, the client 10 has a CPU (central processing unit) 101 for overall control of the client 10, a ROM (read only memory) 102 for storing various programs and data, a RAM (random access memory) 103 for temporarily storing programs and data as a working area, a FDD (flexible disk drive) 104 for reading flexible disks (not shown), a CDD (compact disk drive) 105 for reading CD-ROMs (not shown), a hard disk 106 for storing data and programs to be executed by CPU, a display unit 107 such as a liquid crystal display for displaying various information, an input unit 108 such as a keyboard, a mouse and others used for entering various instructions, and a network interface 109 such as a LAN card for connecting to network 60, all of which are interconnected with each other via a bus 110 for exchanging signals.

The hard disk 106 can store programs such as a printer drivers for controlling printers and application software for data transmission. The printer drivers to be installed on hard disk 106 are software programs for controlling printers for converting the character and image data received from the application program to PDL (page description language) that can be understood by the printers in order to form print jobs. The printer drivers are equipped with a page composing function for reducing sizes and printing multiple pages of data on a single sheet of paper, a function for monitoring the conditions of the printers and warning out-of-paper and out-of-toner conditions, etc.

Figure 3:
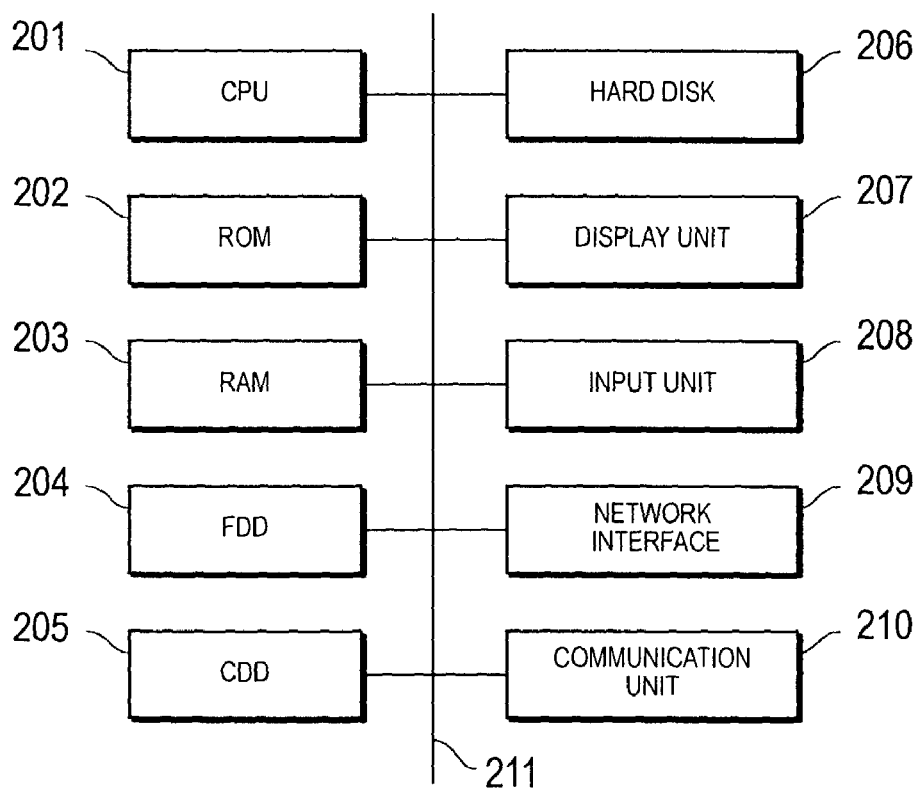
FIG. 3 is a block diagram showing the general constitution of a print server.
Figure 4:
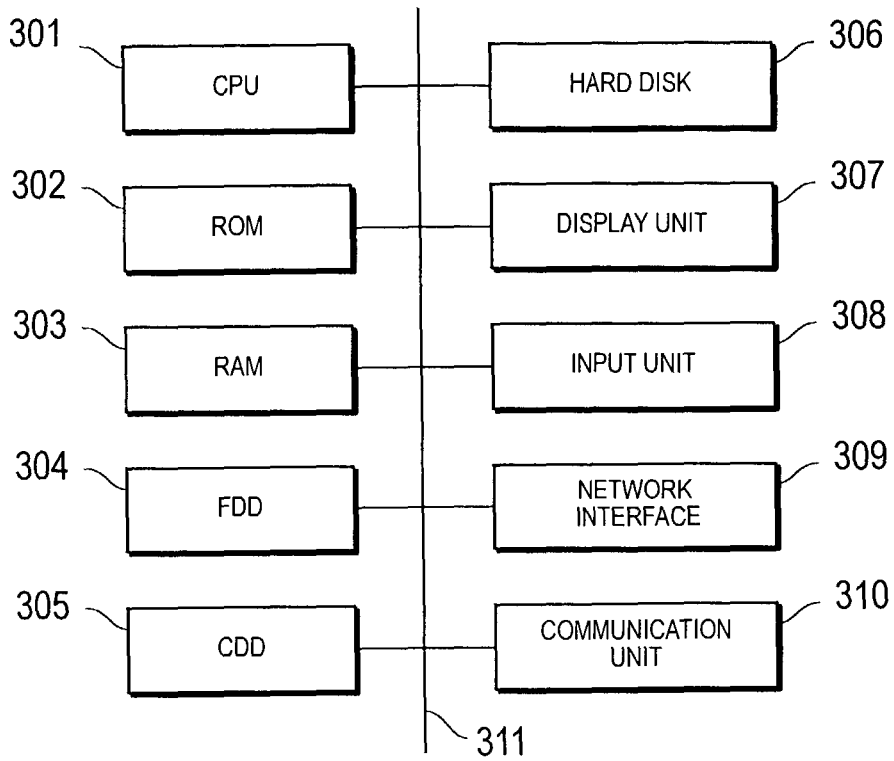
FIG. 4 is a block diagram showing the general constitution of another print server.

FIG. 3 and FIG. 4 are block diagrams for showing the general constitutions of print servers 20 and 30 respectively. The print servers 20 and 30 are server computers for printers.

Hereinafter the constitution of the print server 20 will be described and that of the print server 30 will be omitted as it is identically constituted as the print server 20.

The print server 20 has a CPU 201, a ROM 202, a RAM 203, a FDD 204, a CDD 205, a hard disk 206, a display unit 207, an input unit 208, a network interface 209, and a communication unit 210, all of which are interconnected with each other via a bus 211 for exchanging signals.

A hard disk 206 can store application software for transmitting and receiving data. A hard disk 206 stores a program for understanding printing control data, which is described in PDL or other languages and included in a print job received from the external client 10, and converting it into an intermediate record of a format that can be processed internally, and a program for generating image data based on the generated intermediate record, thus making it possible to generate the image data from the print job by executing those programs.

The communication unit 210 consists of an interface such as an IEEE 1394 serial bus and its control part. The communication unit 210 is capable of transmitting and receiving various data via the IEEE 1394 serial bus.

Figure 5:
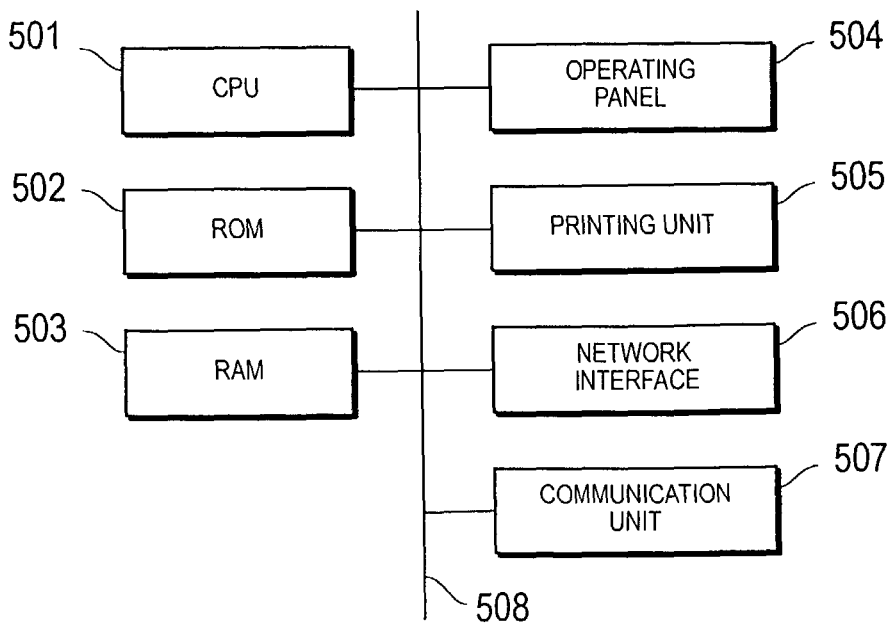
FIG. 5 is a block diagram showing the general constitution of a printer.

FIG. 5 is a block diagram showing the general constitution of a printer 50.

The printer 50 is for printing image data generated by the print server 20 or 30 based on the instructions received from the print server. Hereinafter the constitution of printer 50 will be described and those of printers 51 through 53 will be omitted as they are identically constituted as printer 50.

The printer 50 has a CPU 501, a ROM 502, a RAM 503, an operating panel 504, a printing unit 505, a network interface 506, and a communication unit 507, all of which are interconnected with each other via a bus 508 for exchanging signals.

The operating panel 504 is used for various information displays and entering various instructions. Printing unit 505 prints image data on recording medium such as paper by means of a known image forming process using laser beams.

The client 10, the print servers 20 and 30, the printers 50 through 53 may include components other than all of the above, or may not include a portion of the above components.

Figure 6:
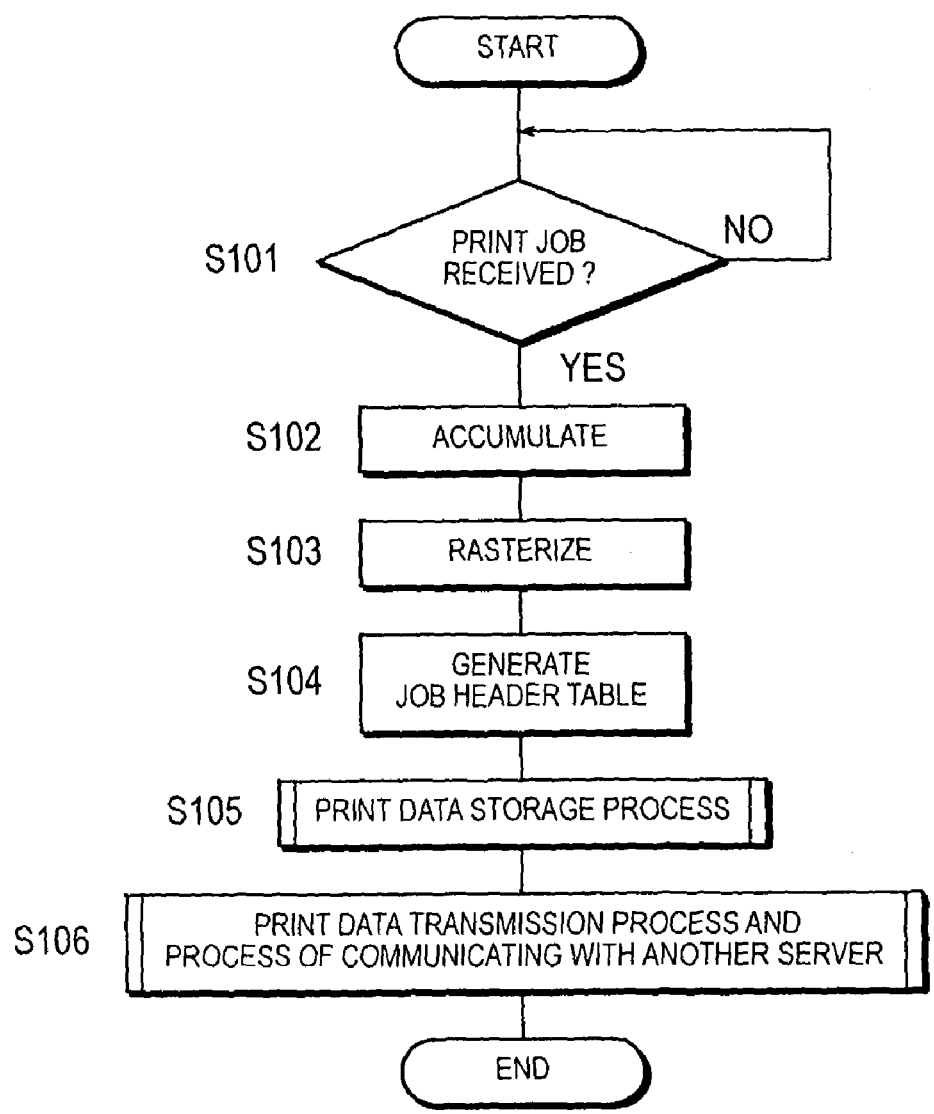
FIG. 6 is a flowchart for describing the process conducted in the print server.
Figure 7:
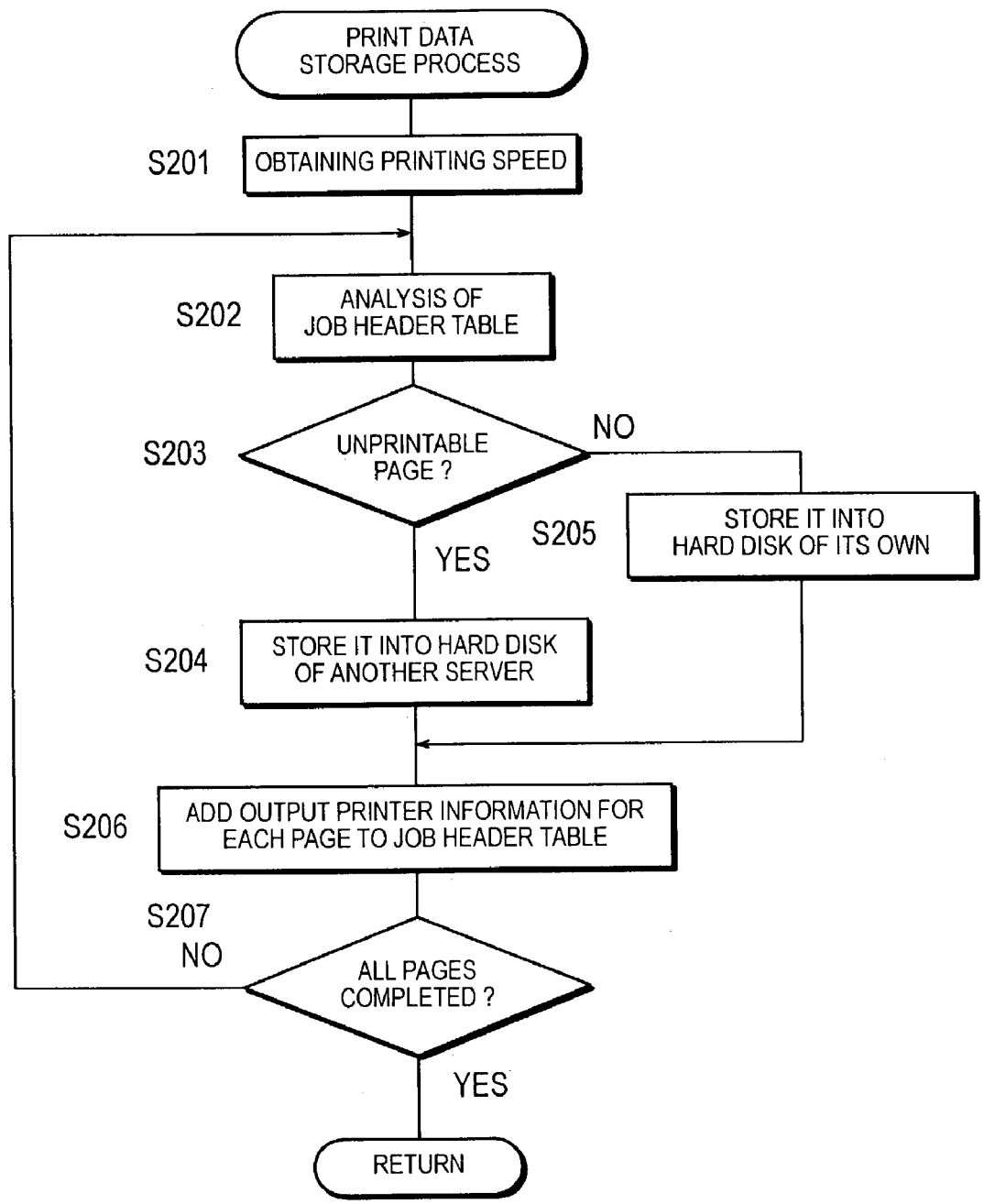
FIG. 7 is a flowchart for describing a storage process of print data.
Figure 8:
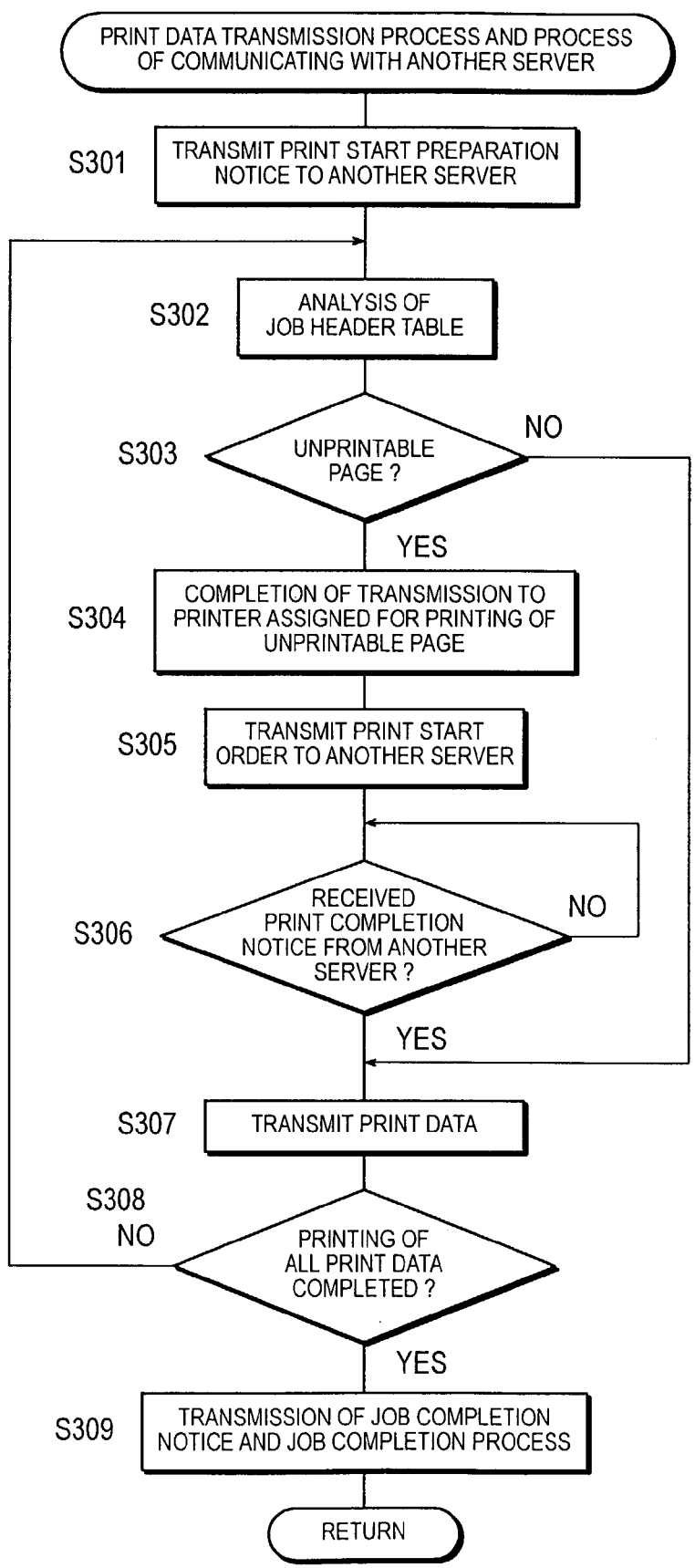
FIG. 8 is a flowchart for describing a print data transmission process and a process of communicating with another print server.
Figure 9:
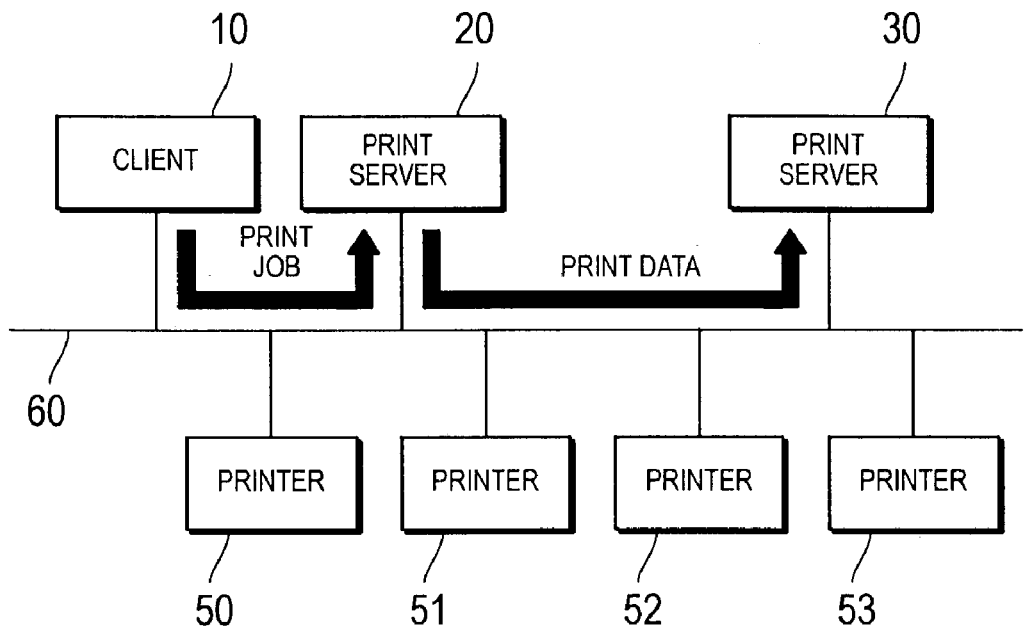
FIG. 9 is a schematic diagram showing the flows of print job and print data.
Figure 10:
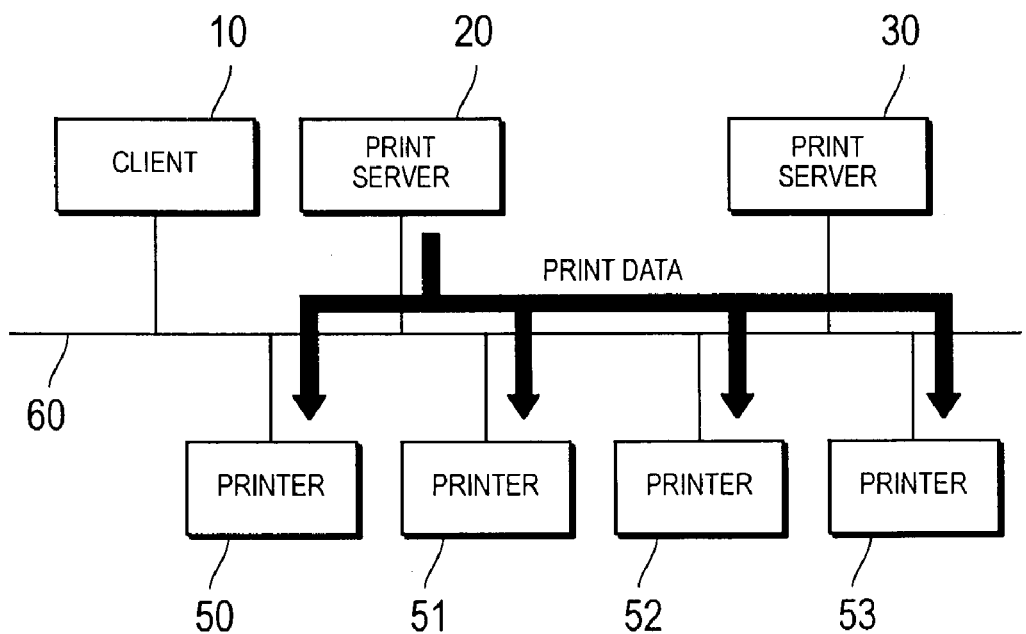
FIG. 10 is a schematic diagram showing the flow of print data.
Figures 11, 12:
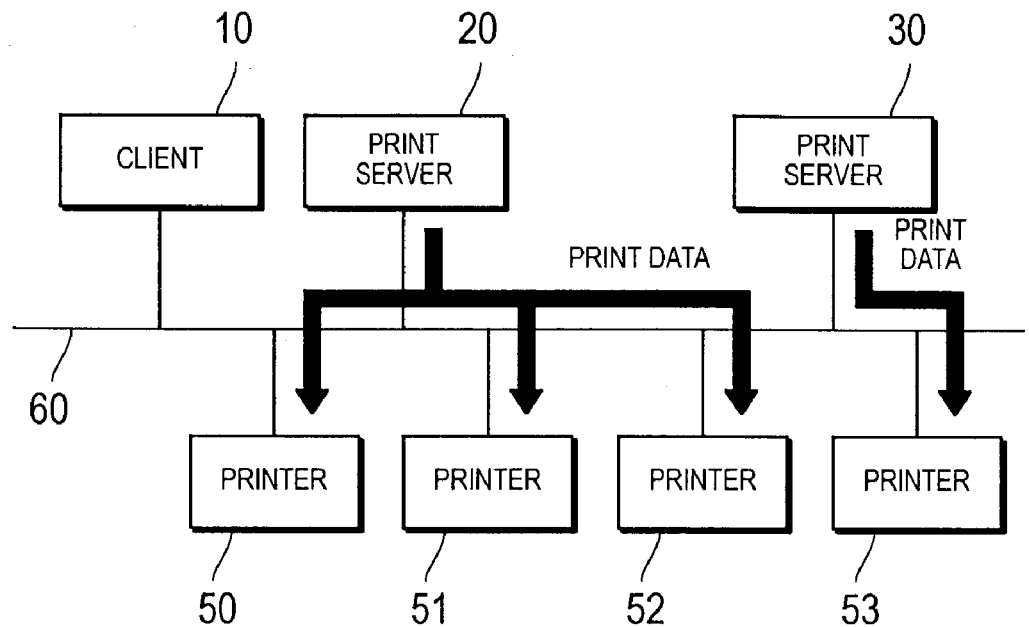
FIG. 11 is a schematic diagram showing the flow of print data.
FIG. 12 is a diagram showing an example of job header table.

Next, the process performed in the print server 20 will be described below referring to FIG. 6 through FIG. 11. FIG. 6 through FIG. 8 are flowcharts for describing the processes performed in print server 20 and FIG. 9 through FIG. 11 are diagrams schematically showing the flow of print job or print data. The algorithm shown in the flowcharts of FIG. 6 through FIG. 8 is stored as a program in a storage unit such as a hard disk 206 and executed by CPU 201.

First, a judgment is made whether any print job generated by the client 10 has been received (S101). If no print job has been received (S101: No), it waits until a job is received. When a print job is received (S101: Yes; see FIG. 9), print job is sent to the hard disk 206 for temporary storage (S102). Step S102 is executed by a print job request control module called a print spooler. Next, the print job that has become printable is rasterized (S103). More specifically, a print job is converted into image data of a printable bitmap format (hereinafter called "print data") by printers 50 through 53.

Next, the data transfer speed of transferring each page to the printer (speed of reading the data from the hard disk) is calculated based on the data size of each page of the print data obtained by rasterizing, and a job header table such as the one shown in FIG. 12 is prepared (S104). For example, information about a print job of 1000 pages containing images is recorded on the job header table shown in FIG. 12, and herein the data size (bytes) and data transfer speed (PPM) are recorded for each page. The bit rate for transferring data from the hard disk, which is the information required for generating a job header table, can be obtained by means of, for example, a special purpose application program.

In step S105, the print data storage process is performed based on the contents of the job header table. In other words, if the print data is analyzed for each page and it is judged that no image deficiency will occur during printing, the print data of the page will be stored in the hard disk 206 of its own machine. On the other hand, if it is judged that image deficiency is expected to occur during printing, the print data of the page is transferred to another print server 30 to be stored in a hard disk 306 of the machine (see FIG. 9).

Next, the storage process of the print data in step S105 will be described below with reference to FIG. 7.

First, obtain the total printing speed of all the printers that are connected to print server 20 and available for the current print job (S201). More specifically, obtain the status information of each printer, make a judgment whether it is available for the print job based on the status information, and obtain the printing capabilities (including the printing speeds) of the printers that are available for the print job from the status information. For example, if four printers 50 through 53 are available for the print job, and each of them can print 40 pages per minute (40 PPM), the printing speed of the system is 40 PPM×4=160 PPM.

Next, let us perform the analysis of the job header table generated in step S104 (S202). In other words, the printing speed is compared against the data transfer speed for the page to be processed based on the contents of the job header table. After the comparison, a judgment will be made whether the page in question is a page that can be printed (S203). In other words, a judgment is made whether any image deficiency will occur during the printing of the page. It is generally judged here that the page in question is not printable if the data transfer speed is lower than the printing speed, but the invention is not limited by such a judgment method. A judgment can be made that the page in question is not printable if the ratio of the data transfer speed relative to the printing speed is lower than or equal to a specified threshold value.

For example, the second page of the print data can be transmitted at speeds only up to 119 PPM as its data size is too large as shown in the job header table of FIG. 12. In this case, image deficiency will occur during printing as the data transmission speed becomes lower than the printing speed (160 PPM).

If it is judged that the page in question is not unprintable, in other words, if it is judged that image deficiency is not expected to occur during printing (S203: No), as a result of comparing the printing speed and the data transfer speed of the page in question, store the page in question into the hard disk 206 of the print server 20, which is its own machine (S205). On the other hand, if it is judged that the page in question is unprintable, in other words, if it is judged that image deficiency is expected to occur during printing (S203: Yes), transfer and store the page in question in the hard disk 306 of another print server 30 (S204).

Next, the output printer information that specifies the output printer assigned for each page at the time of transmission of the print job is added to the job header table (S206).

A judgment is then made as to whether the process of steps S202 through S207 is completed for all the pages of the print data (S207). If the process for all the pages is not completed (S207: No), the process of steps S202 through S207 is repeated. On the other hand, if the process for all the pages is completed (S207: yes), the operation advances to step S106.

Getting back to the description of the flowchart shown in FIG. 6, the transmission process for the print data and the communication process with another print server are performed in step S106.

Next, the process in step S106 will be described below with reference to FIG. 8.

If the print data is transferred to another print server 30 in step S105, a notification of the preparation for print start is transmitted to the print server 30. The reason the notification of the preparation for print start is transmitted to the print server 30 is for occupying print server 30. This prevents other jobs from being executed by the print server 30 and makes it impossible to output the intended print data in synchronization.

An analysis of the job header table is performed at this point (S302). As a result of the analysis, a judgment is made whether the page intended to be processed is an unprintable page (S303). Since the contents of these analysis (S302) and judgment (S303) are identical to steps S202 and S203 of FIG. 7, their descriptions will not be repeated.

If the page intended to be processed is not unprintable, in other words, if it is judged that no image deficiency will occur during printing (S303: No), the print data is transmitted from the print server 20 (S307). The print data is divided into several groups of a specified number of pages and sent to printers 50 through 53 specified at the time of transmission of the print job (see FIG. 10), and printing is executed in each printer.

On the other hand, if the page to be processed is judged to be unprintable, in other words, if it is judged that image deficiency will occur during printing (S303: No), the print data transmission to the printer scheduled to print the page is terminated (S304). A print start instruction is transmitted to another print server 30 to which the print data for the unprintable page is transmitted (S305). While the print server, which is to output an unprintable page to the printer 53 that is scheduled to print the page, is being switched from the print server 20 to another printer server 30 in steps S304 and S305, the transmissions of print data to other printers 50 through 52 are continued in parallel and their respective printers continue to print.

It waits until it receives from the print server 30 a printing completion notice advising that the process of print data transmission by the print server 30 to the printer 53 and the printing by the printer 30 are completed (S306: No). Even during this wait, print data transmissions to other printers 50 through 52 and printing by each printer continue simultaneously (FIG. 11).

When the printing completion notice is received from the print server 30 (S306: Yes), it restarts transmission of print data to the printer 53 (S307), if any remaining print data exists concerning the printer 53. Also, transmissions of print data to other printers 50 through 52 are executed simultaneously, if any remaining print data exist concerning the printers 50 through 52 as well. At this time, the flow of print data returns to the state shown in FIG. 10.

Then, a judgment is made as to whether all print data concerning the print job have been transmitted to the printers and the printing is completed (S308). If the printing of all the pages is not completed (S308: No), the process of steps S302 through S308 is repeated. On the other hand, if the printing of all the pages is completed (S308: Yes), a job completion notice is transmitted to another print server 30 notifying that the execution of the print job received in step S101 and performs the specified print job completion process (S309).

Figure 13:
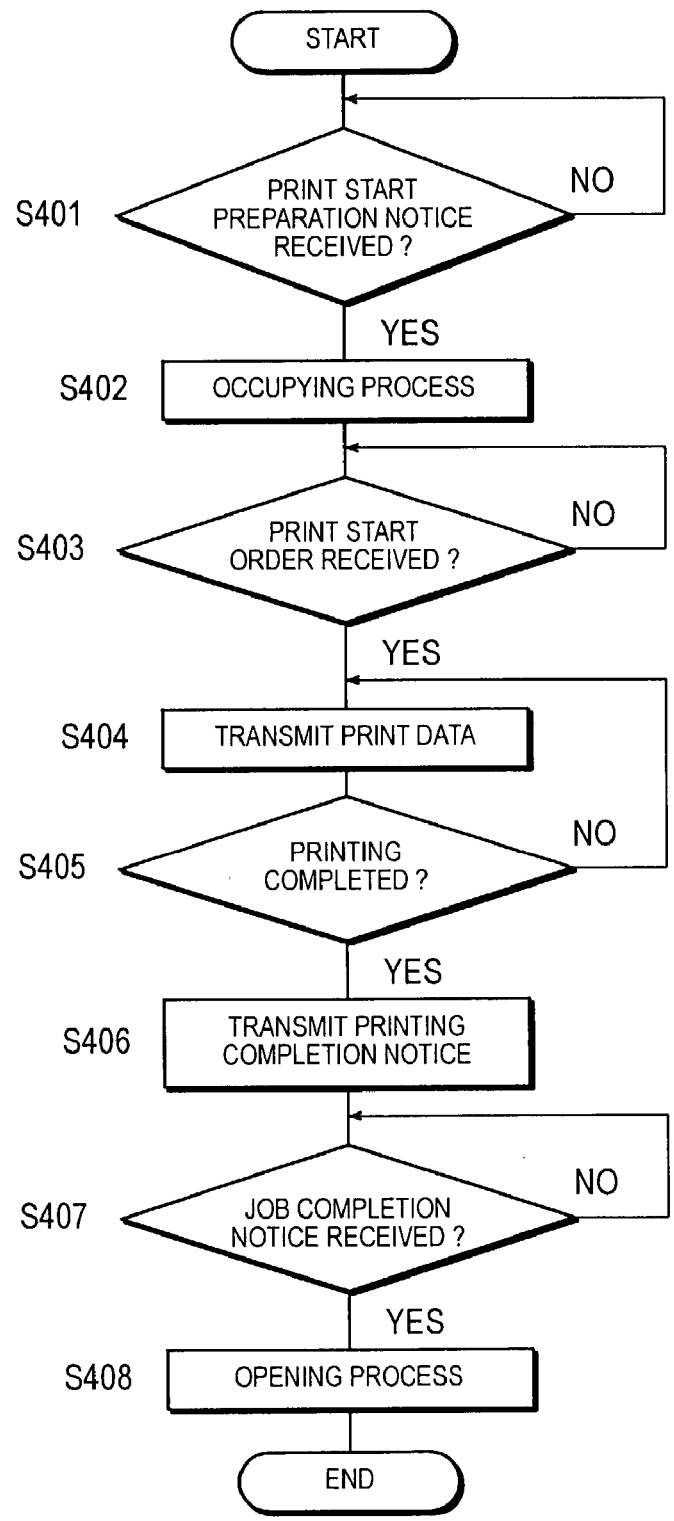
FIG. 13 is a flowchart for describing a process conducted in another print server.

Next, the process performed in print server 30 will be described with reference to FIG. 13. The algorithm shown in the flowchart of FIG. 13 is stored as a program in a storage unit such as the hard disk 306 and executed by the CPU 301.

The following description describes a case where the print data that consists of pages that are judged unprintable by the print server 20 are received in advance from the print server 20 and the received print data are stored in the hard disk 306.

First, it waits until a print start preparation notice is received from the print server 20 (S401: No). When the print server 30 receives a print start preparation notice (S401: Yes), the print server 30 executes a process of occupying print server 30 itself so that the print server 30 does not start other jobs unrelated to the print start preparation notice (S402). More specifically, the status information is changed to occupy print server 30. The print server 30 can also accept other jobs without executing the occupying process. In this case, it is preferable to set up the paper used for printing the job according to the present embodiment and the paper used for other jobs separately so that they do not mix up with each other.

Next, it waits until a print start order is received from the print server 20 (S403: No). When the print server 30 receives a print start order (S403: Yes), the print server 30 transmits the print data, which have been received from the print server 20 in advance and stored in the hard disk 306, to the printer 53 (S404; see FIG. 11). The printer 53, to which the print server 30 transmits the print data, is a printer, to which the print server 20 completed the print data transmission in step S304, i.e., the printer, which is vacated as a result of the reduction of the number of printers to which the print server 20 is transmitting the data. At this point, the printer 53 prints the received print data on paper.

A judgment is made then as to whether the print data transmitted to the printer 53 is completed (S405). If the printing is not completed (S405: No), the system returns to step S404 and repeats the process of steps S404 and S405 to continue the print data transmission to the printer 53. On the other hand, if the printing is completed (S405: Yes), a print completion notice is transmitted to the print server 20 advising that the print data received from the print server 20 has been transmitted to the printer 53 and the printing has been completed (S406).

After that, it waits until a job completion notice is received from the print server 20 advising the print job is completed (S407: No).

When the job completion notice is received from the print server 30 (S407: Yes), the print server 30 executes a process of opening the print server 30 itself as a preparation for other jobs (S408).

According to the first embodiment, a page judged that it will cause image deficiency during printing, can be transmitted to a printer via another print server. Therefore, it is possible to prevent image deficiency from occurring during printing by means of securing a necessary data transfer speed and preventing the printing speed from exceeding the data transfer speed. Moreover, since there is no need of reducing the number of printers for printing, the printing operation can be performed efficiently from the standpoint of the overall system.

Figure 14:
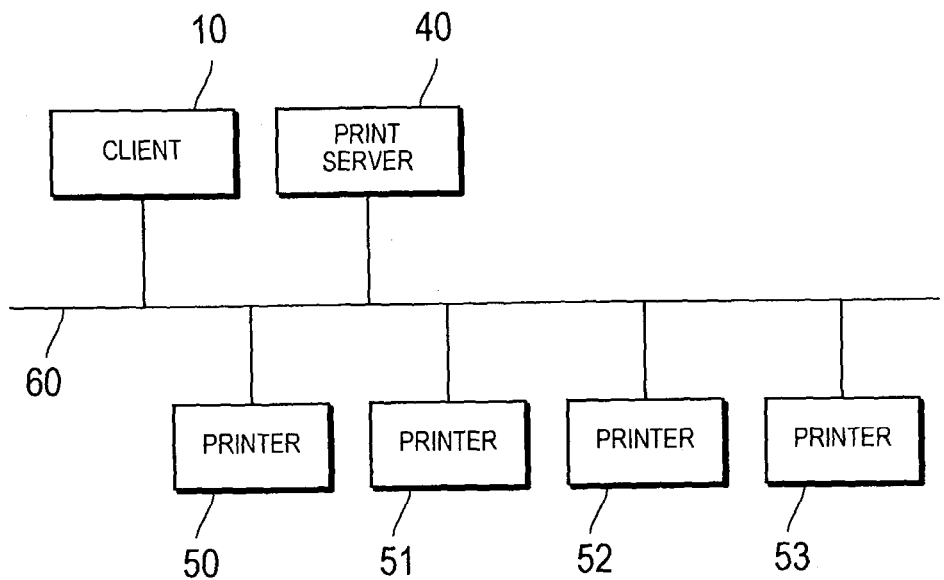
FIG. 14 is a total constitutional drawing of a printing system using a print server in accordance with the second embodiment of the present invention.

FIG. 14 is a total constitutional drawing of a printing system using a printing server in accordance with the second embodiment of the present invention. In the following, the second embodiment will be described primarily concerning the points that are different from the first embodiment and omitting the items common to both of them.

As shown in FIG. 14, the printing system includes a client 10, printing server 40, and a plurality of printers 50 through 53, all of which are interconnected to be able to communicate with each other via a network 60. In the printing system of this embodiment, a single print server 40 is used.

Figure 15:
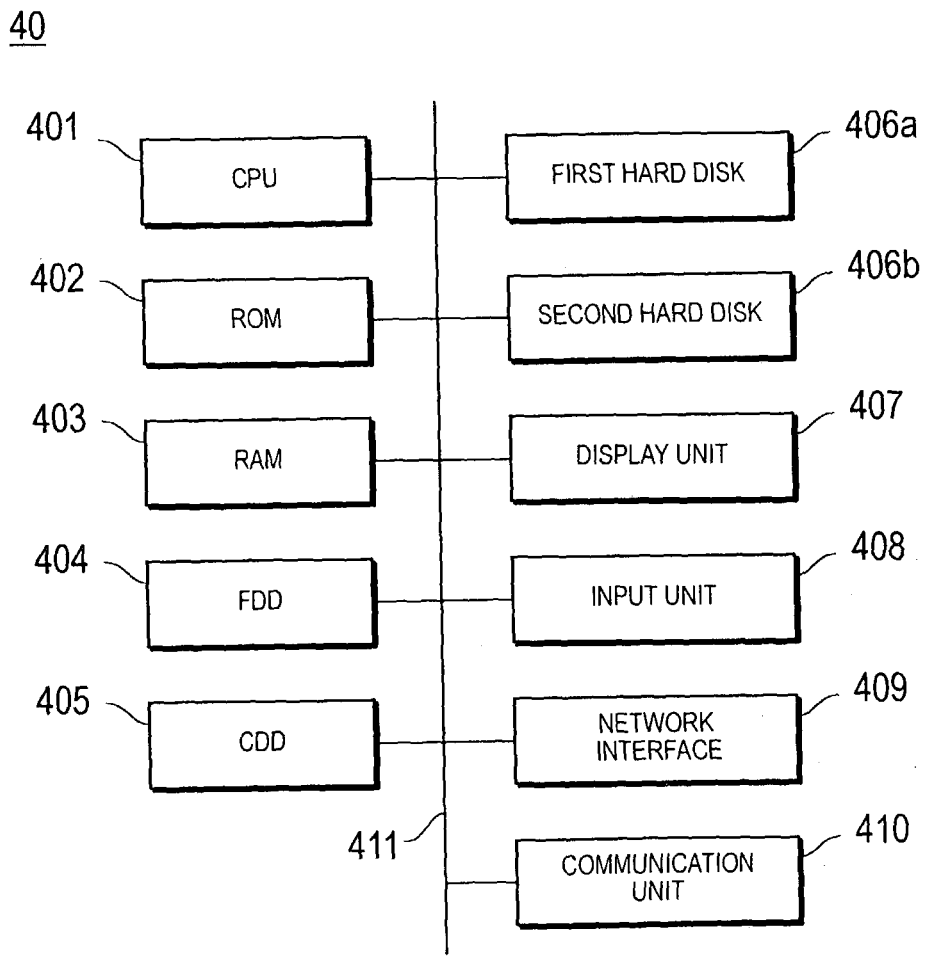
FIG. 15 is a block diagram showing the general constitution of a print server in accordance with the second embodiment.

FIG. 15 is a block diagram showing the general constitution of a print server 40. The print server 40 has a CPU 401, a ROM 402, a RAM 403, a FDD 404, a CDD 405, the first hard disk 406a, the second hard disk 406b, a display unit 407, an input unit 408, a network interface 409, and a communication unit 410, all of which are interconnected with each other via a bus 411 for exchanging signals.

Thus, the print server 40 of this embodiment has the first hard disk 406a, which is normally used, and the second hard disk 406b, which is separate from the first hard disk 406a. The second hard disk 406b preferably has a faster reading capability than the first hard disk 406a, thus being capable of a more efficient print data transmission.

Figure 16:
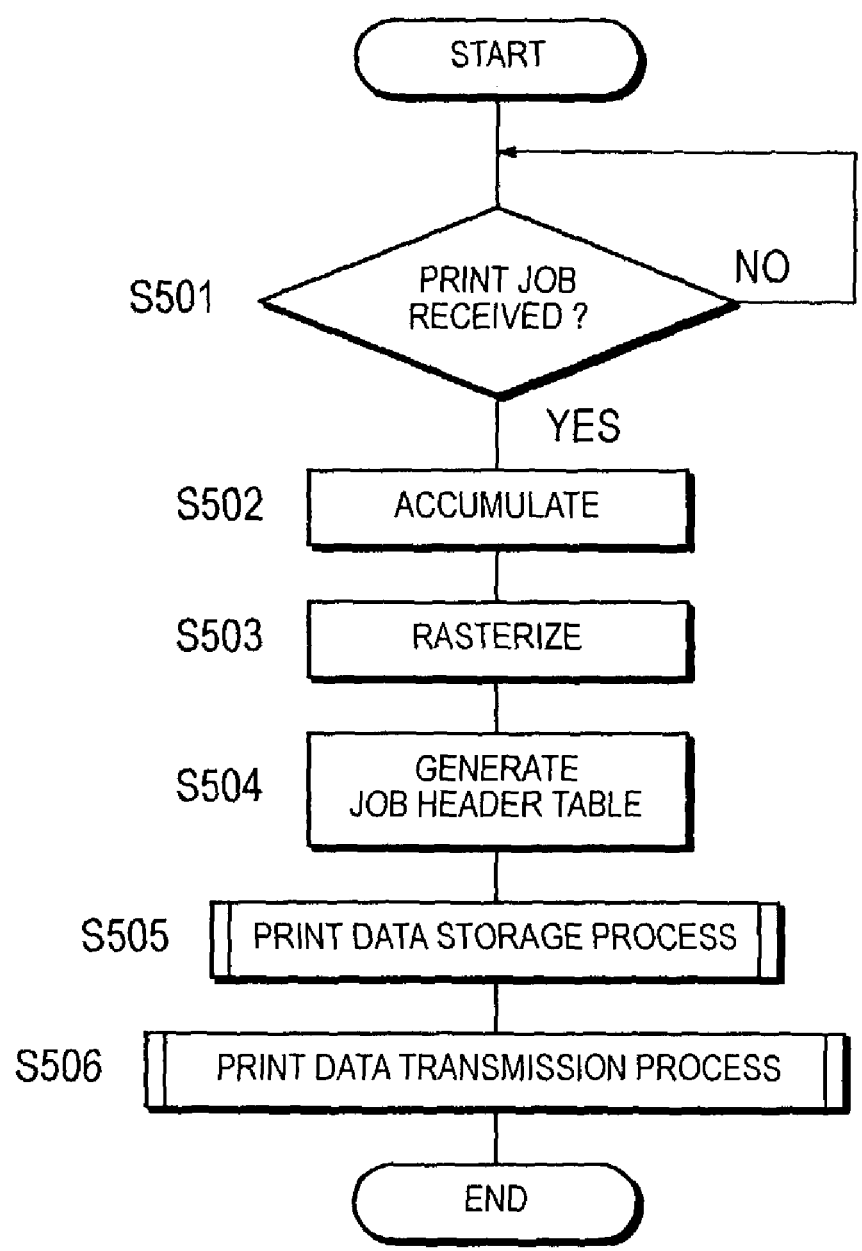
FIG. 16 is a flowchart for describing a process conducted in the print server in accordance with the second embodiment.
Figure 17:
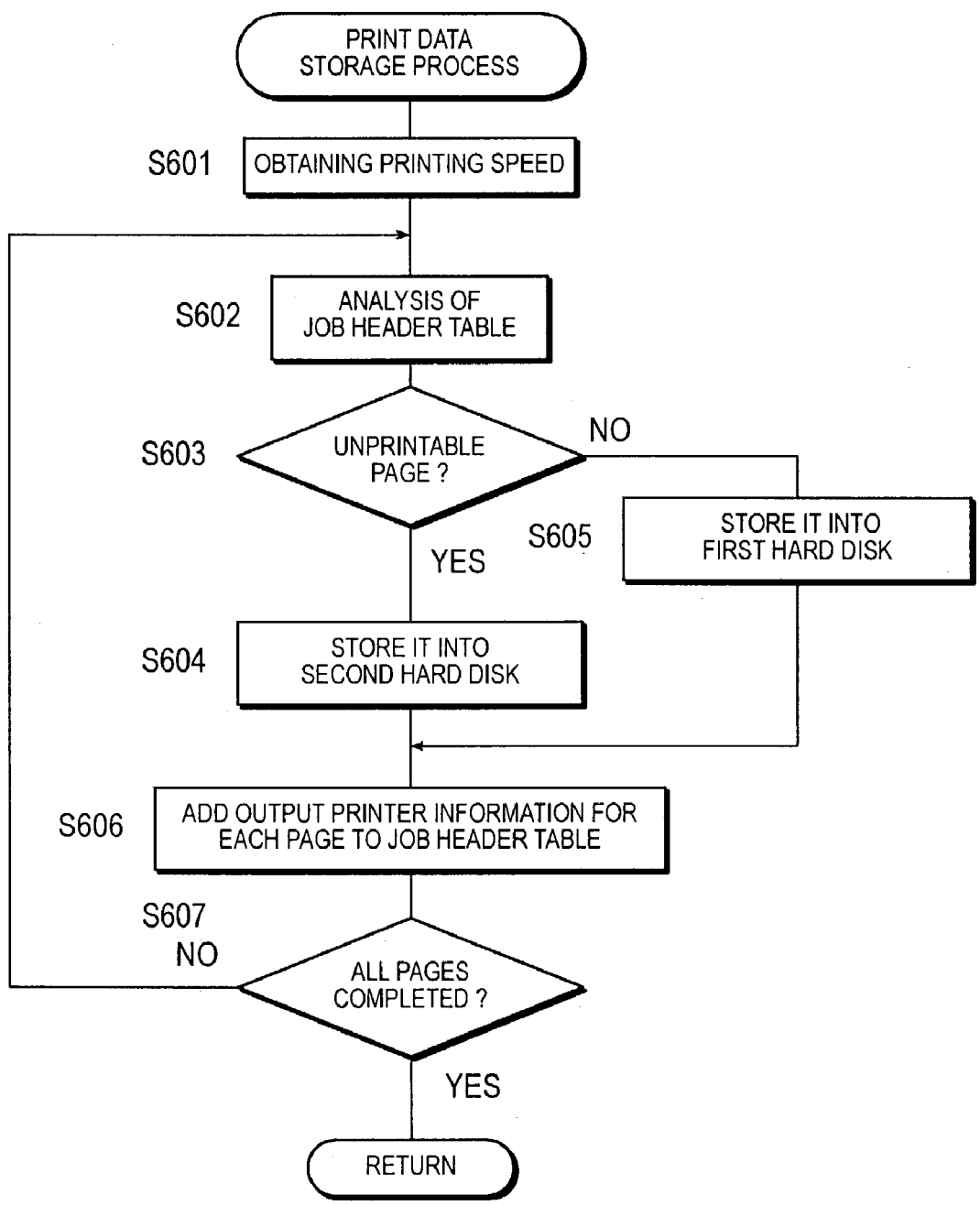
FIG. 17 is a flowchart for describing a storage process of print data.
Figure 18:
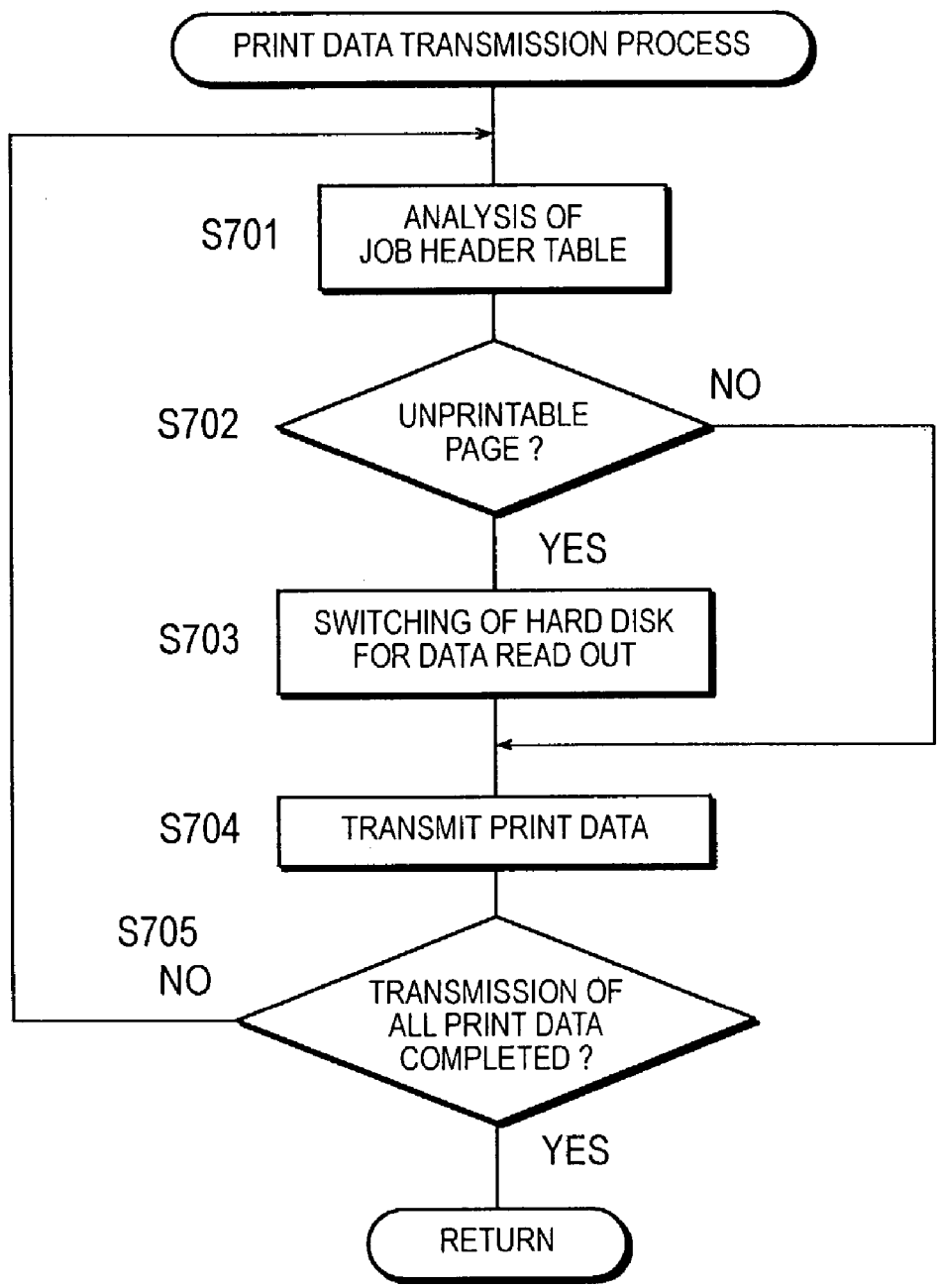
FIG. 18 is a flowchart for describing a print data transmission process.
Figure 19:
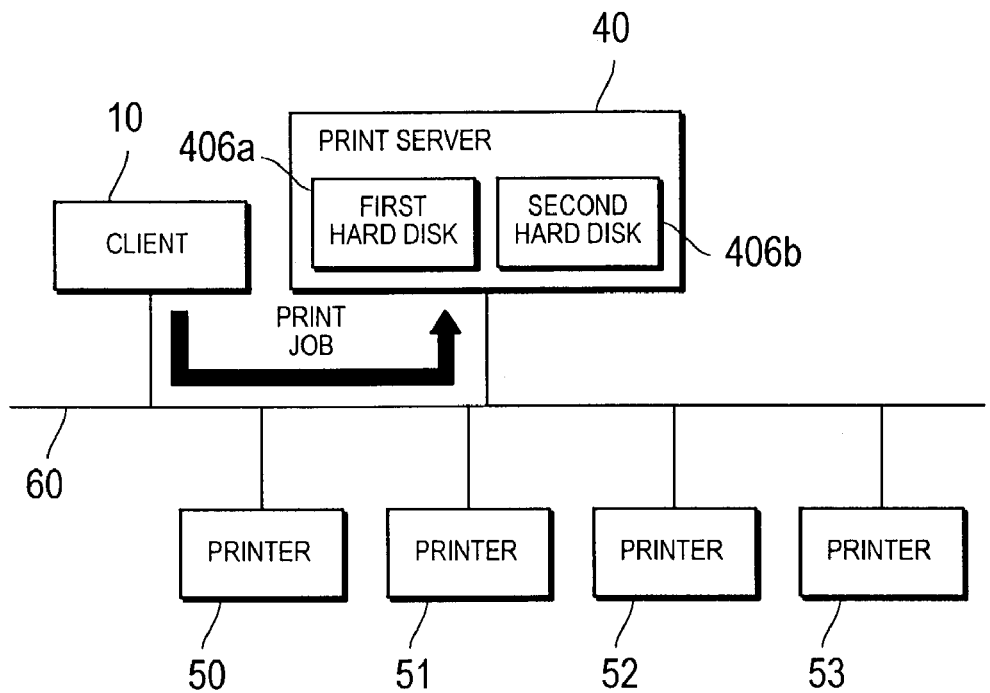
FIG. 19 is a schematic diagram showing the flow of print job.
Figure 20:
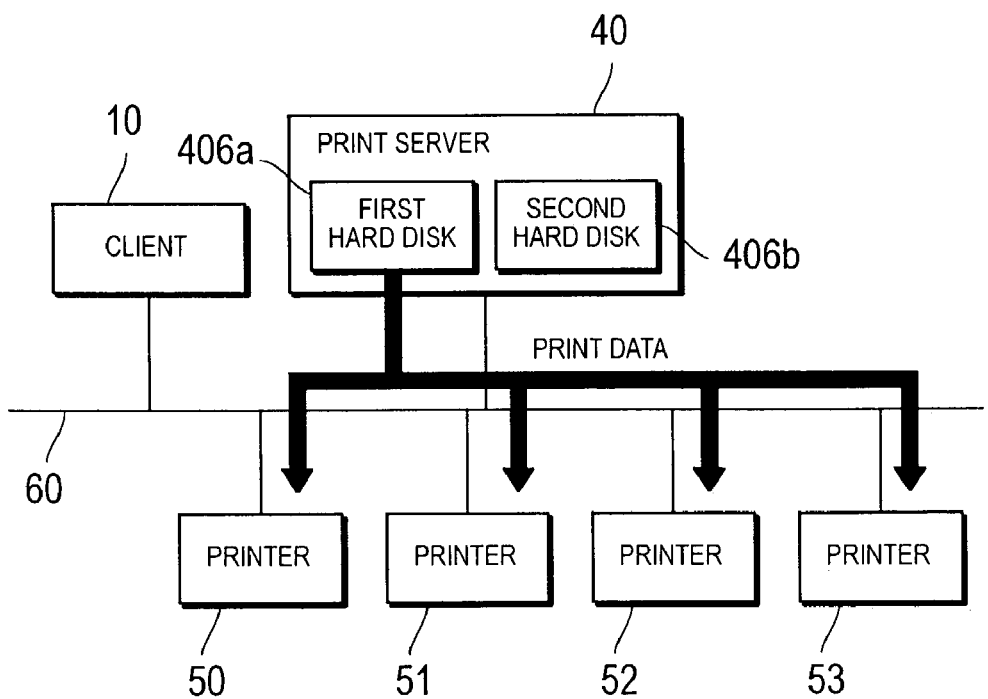
FIG. 20 is a schematic diagram showing the flow of print data.
Figure 21:
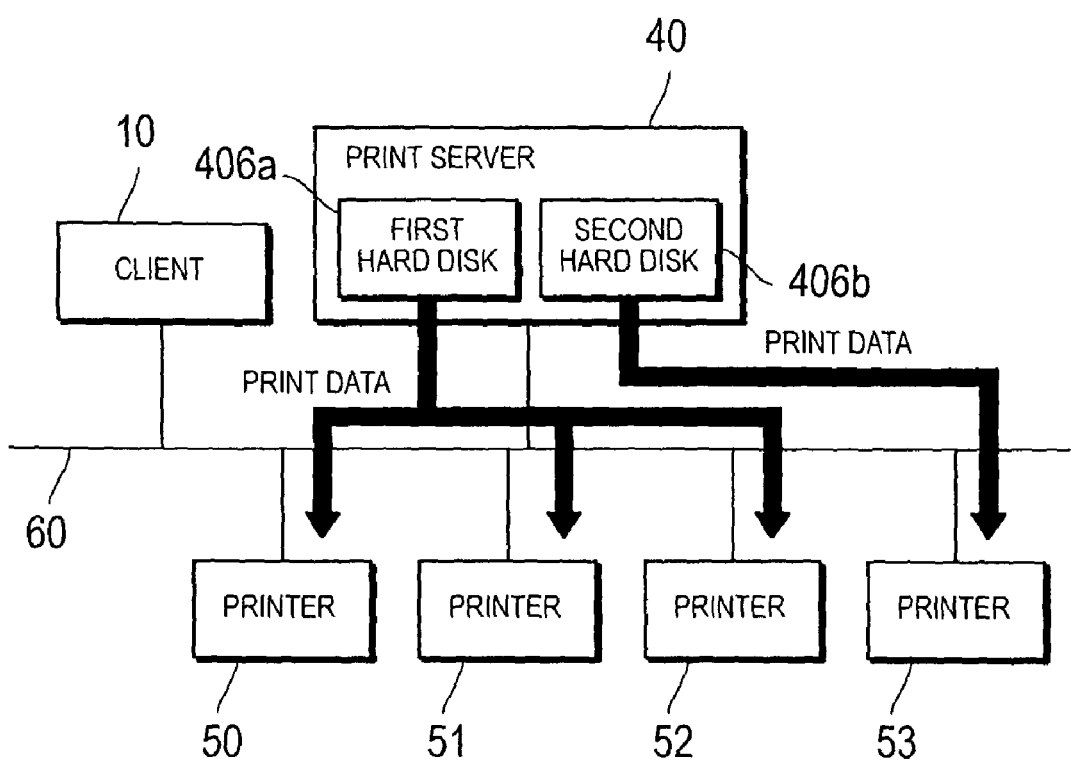
FIG. 21 is a schematic diagram showing the flow of print data.

Next, the process performed in the print server 40 will be described below referring to FIG. 16 through FIG. 21. FIG. 16 through FIG. 18 are flowcharts for describing the processes performed in the print server 40 and FIG. 19 through FIG. 21 are diagrams schematically showing the flow of print job and print data. The algorithm shown in the flowcharts of FIG. 16 through FIG. 18 is stored as a program in a storage unit such as the first hard disk 406a and executed by the CPU 401.

The process at the print server 40 begins as the print server 40 receives the print job prepared by the client 10 (FIG. 19). Steps S501 through S504 in FIG. 16 are identical to steps S101 through S104 in FIG. 6.

In step S505, the print data storage process is performed based on the contents of the job header table.

If it is judged that the page in question is not unprintable, in other words, it is judged that image deficiency is not expected to occur during printing (S603: No), as a result of comparing the printing speed and the data transfer speed of the page in question as shown in FIG. 17, store the page in question in the first hard disk 406a (S605). On the other hand, if it is judged that the page in question is unprintable, in other words, it is judged that image deficiency is expected to occur during printing (S603: Yes), store the page in question in the second hard disk 406b (S604). Steps S601 through S603, S606, and S607 of FIG. 17 are identical to steps S201 through S203, S206, and S207 of FIG. 7.

Getting back to the flow chart shown in FIG. 16, the transmission process of the print data stored in the first hard disk 406a or the second hard disk 406b is performed in step S506.

Next, the process in step S506 will be described below with reference to FIG. 18.

First, an analysis of the job header table is performed (S701). As a result of the analysis, a judgment is made whether the page intended to be processed is an unprintable page (S702). The contents of these analysis (S701) and judgment (S702) are identical to steps S202 and S203 of FIG. 7.

If the page intended to be processed is not unprintable, in other words, it is judged that no image deficiency will occur during printing (S702: No), the page will be read out from the first hard disk 406a and transmitted to the printer (S704). Unless the switching process of step S703 to be described later is not performed, the first hard disk 406a, which is normally used, is set up as the hard disk for reading print data in this embodiment. The print data is divided into several groups of a specified number of pages and sent to the printers 50 through 53 specified at the time of transmission of the print job (see FIG. 20) and printing is executed in each printer.

On the other hand, if the page intended to be processed is judged to be unprintable, in other words, if it is judged that image deficiency will occur during printing (S702: Yes), the disk from which the print data is to be read will be switched to the second hard disk 406b (S703), and the page will be read from the second disk 406b to be transmitted to, for example, the printer 53 (S704). At this point, the printer 53 prints the received print data on paper. The printer 53, to which the print data of a page read from the second hard disk 406b is transmitted, is a printer, to which the print data of a page immediately prior to the page in question has been transmitted, i.e., the printer vacated as a result of the reduction of the number of printers, to which the data from the first hard disk 406a is to be transmitted, due to the switching of the hard disk from which the print data is to be read. While the print data read from second hard disk 406b is being transmitted to printer 53, the print data read from the first hard disk 406a is transmitted simultaneously to other printers 50 through 52, and the printing process is continued on each printer (FIG. 21).

Then, a judgment is made as to whether all print data concerning the print job have been transmitted to the printers (S705). If the transmission of all the print data is not completed (S705: No), the process of steps S701 through S705 is repeated.

As can be seen from the above, the second embodiment makes it possible to read a page that are judged to cause image deficiency during printing from the second hard disk 406b which allows high speed data reading, and transmit it to a printer. Therefore, it is possible to prevent image deficiency from occurring during printing by means of securing a necessary data transfer speed and preventing the printing speed from exceeding the data transfer speed. Moreover, since there is no need of reducing the number of printers for printing, the printing operation can be performed more efficiently from the standpoint of the overall system.

It is obvious that this invention is not limited to the particular embodiments shown and described above but may be variously changed and modified without departing from the technical concept of this invention.

For example, although the control of transferring the print data of a page that is judged to cause image deficiency to another server 30 or the second hard disk 406b was described in the above embodiments, it is also possible to add another control for reducing the number of printers for executing printing in the entire print system, if there is a concern for causing image deficiency even if the aforementioned control is applied. In such a case, although the printing speed in the entire printing system drops slightly, it can ensure the prevention of image deficiency.

Moreover, although the case of transmitting print data to printers after the process of storing print data for all the pages was described above in the second embodiment, it is also possible to read print data from a hard disk and transmit it to printers while analyzing the print data page by page and storing it to the hard disk The means of executing the processes shown in FIGS. 6 through 8, FIG. 13 and FIGS. 16 through 18 in the print server as well as the printing method can be realized either by a dedicated hardware circuit or by a programmed computer. The program can be provided either by a computer readable recording medium such as a flexible disk and a CD-ROM, or by being supplied on-line via a network such as the Internet. In this case, the program recorded on a computer readable medium is normally transferred to a storage unit such as a hard disk and stored. The program can also be provided as independent application software or can be built into the software of the device as a part of its function.

What is claimed is:

1. A printing method for a printing system having a plurality of image forming devices and a plurality of data transfer devices, comprising:

prior to transferring printing data to an image forming device, performing an arithmetic step of calculating data transfer speed in transferring data from a first data transfer device to the plurality of image forming devices in the printing system, and a comparison judgment step of comparing the data transfer speed calculated in said arithmetic step with printing speed at the image forming devices in the printing system, and judging whether image deficiency will occur in printing data that is to be transferred from the first data transfer device to at least one of the plurality of image forming devices based on the comparison wherein in said comparison judgment step, a judgment is made that image deficiency will occur in printing when the data transfer speed calculated in said arithmetic step is lower than the printing speed of said plurality of image forming devices; and a control step of providing control for transferring a first portion of said printing data that is less than an entirety of the printing data to at least one of the image forming devices from a second data transfer device if it is judged in said judgment step that image deficiency will occur in the first portion of said printing data, and transferring a second portion of said printing data that is less than the entirety of the printing data to at least one of the image forming devices from the first data transfer device if it is judged in said judgment step that image deficiency will not occur in the second portion of said printing data.

2. The printing method as claimed in claim 1, wherein said control step includes the further step of transferring said first portion of said printing data from the first data transfer device to the second data transfer device.

3. The printing method as claimed in claim 1, wherein said control step includes the further step of reducing the number of the image forming devices to which the second portion of the data is to be transferred from the first data transfer device.

4. The printing method as claimed in claim 3, wherein said control step includes the further step of transferring the first portion of the data from the second data transfer device to an image forming device vacated by reducing the number of the image forming devices to which the second portion of the data is to be transferred from the first data transfer device.

5. The printing method as claimed in claim 1, further comprising:

a second comparison judgment step of judging whether image deficiency will occur in printing the first portion of the data transferred to an image forming device from the second image data transfer device, and in said control step, reducing the number of the image forming devices which are the data transfer destinations, when it is judged in said second comparison judgment step that image deficiency will occur.

6. The printing method as claimed in claim 1, wherein, in the control step, each page of the printing data is determined to be either of a part of the first portion or a part of the second portion.

7. A printing method for a printing system having a plurality of image forming devices and a plurality of data transfer devices, comprising:

prior to transferring printing data to an image forming device, performing an arithmetic step of calculating data transfer speed in transferring data from a first data transfer device to the plurality of image forming devices in the printing system, and a comparison judgment step of comparing the data transfer speed calculated in said arithmetic step with the printing speed at the image forming devices in the system, and judging whether image deficiency will occur in printing data that is to be transferred from a first data transfer device to at least one of the plurality of image forming devices based on the comparison; and a control step of providing control for transferring said data to at least one of the image forming devices from a second data transfer device when it is judged in said comparison judgment step that image deficiency will occur;

wherein in said comparison judgment step, a judgment is made that image deficiency will occur in printing when the data transfer speed calculated in said arithmetic step is lower than the printing speed of said plurality of image forming devices.

8. A printing method for a printing system having a plurality of image forming devices and a plurality of data transfer devices, comprising:, prior to transferring printing data to an image forming device, performing an arithmetic step of calculating data transfer speed in transferring data from a first data transfer device to the plurality of image forming devices in the printing system, and a comparison judgment step of comparing the data transfer speed calculated in said arithmetic step with the printing speed at the image forming devices in the system, and judging whether image deficiency will occur in printing data that is to be transferred from a first data transfer device to at least one of the plurality of image forming devices based on the comparison; and a control step of providing control for transferring said data to at least one of the image forming devices from a second data transfer device when it is judged in said comparison judgment step that image deficiency will occur;

wherein in said comparison judgment step, a judgment is made that image deficiency will occur in printing when the ratio of the data transfer speed calculated in said arithmetic step to the printing speed of said plurality of image forming devices is lower than or equal to a specified threshold value.

9. A printing system comprising a plurality of image forming devices connected to be able to transfer data with each other, a first data transfer device and a second data transfer device, wherein said printing system is equipped with:

an arithmetic unit for calculating data transfer speed in transferring data from the first data transfer device to the plurality of image forming devices in the printing system, a comparison judgment unit for comparing the data transfer speed calculated in said arithmetic unit with printing speed at the image forming devices in the system, and judging whether image deficiency will occur in printing data that is to be transferred from the first data transfer device to at least one of the plurality of image forming devices based on the comparison, wherein in said comparison judgment unit, a judgment is made that image deficiency will occur in printing when the data transfer speed calculated in said arithmetic unit is lower than the printing speed of said plurality of image forming devices; and a control unit for transferring a first portion of said printing data that is less than an entirety of the printing data to the second data transfer device and then to the image forming device from the second data transfer device if it is judged that image deficiency will occur in the first portion of said printing data by the judging unit, and transferring a second portion of said printing data that is less than the entirety of the printing data to at least one of the image forming devices from the first data transfer device if it is judged that image deficiency will not occur in the second portion of said printing data by the judging unit.

10. The printing system as claimed in claim 9, wherein said printing system is equipped with a print server, and said judging unit and said control unit are provided within said print server.

11. The printing system as claimed in claim 9, wherein said printing system is equipped with print servers, and said first data transfer device and said second data transfer device are provided within different servers respectively.

12. The printing system as claimed in claim 9, wherein said printing system is equipped with a print server, and said first data transfer device and said second data transfer device are provided within the same print server.

13. The printing system as claimed in claim 9, wherein each page of the printing data is determined to be either of a part of the first portion or a part of the second portion.

14. A print server for transferring data to a plurality of image forming devices for printing, comprising:
an arithmetic unit for calculating data transfer speed in transferring data from a first data transfer device to the plurality of image forming devices in a printing system,
a comparison judgment unit for comparing the data transfer speed calculated in said arithmetic unit with the printing speed at the image forming devices in the system, and for judging whether image deficiency will occur in printing data that is to be transferred from the first data transfer device to at least one of the plurality of image forming devices based on the comparison, wherein in said comparison judgment unit, a judgment is made that image deficiency will occur in printing when the data transfer speed calculated in said arithmetic unit is lower than the printing speed of said plurality of image forming devices; and
a control unit for providing control for transferring a first portion of said printing data that is less than an entirety of the printing data to at least one of the image forming devices from a second data transfer device if it is judged that image deficiency will occur in the first portion of said printing data by the judging unit, and transferring a second portion of said printing data that is less than the entirety of the printing data to at least one of the image forming devices from the first data transfer device if it is judged that image deficiency will not occur in the second portion of said printing data by the judging unit.

15. The print server as claimed in claim 14, wherein said control unit further provides control for transferring the first portion of the data to the second data transfer device.

16. The print server as claimed in claim 15, wherein said control unit provides control for:
reducing the number of the image forming devices which are the data transfer destinations from the first data transfer device in order to secure a image forming device to which no data will be transferred from the first data transfer device; and
transferring said first portion of the data from the second data transfer device to the image forming device to which no data will be transferred from said first data transfer device.

17. The print server as claimed in claim 14, wherein each page of the printing data is determined to be either of a part of the first portion or a part of the second portion.

18. A computer readable recording medium on which a printing program for transferring data from a plurality of data transfer devices to a plurality of image forming devices for printing is recorded, wherein said printing program causes a computer to execute a process comprising:
prior to transferring printing data to an image forming device, performing an arithmetic step of calculating data transfer speed in transferring data from a first data transfer device to the plurality of image forming devices in the printing system;
a comparison judgment step of comparing the data transfer speed calculated in said arithmetic step with printing speed at the image forming devices in the system and judging whether image deficiency will occur in printing based on the comparison, wherein in said comparison judgment step, a judgment is made that image deficiency will occur in printing when the data transfer speed calculated in said arithmetic step is lower than the printing speed of said plurality of image forming devices; and
a control step of providing control for transferring a first portion of the printing data that is less than an entirety of the printing data to a second data transfer device and then to at least one of said image forming devices from the second image data transfer device if it is judged that image deficiency will occur in printing the first portion of said printing data in said comparison judgment step, and transferring a second portion of said printing data that is less than the entirety of the printing data to at least one of the image forming devices from the first data transfer device if it is judged that image deficiency will not occur in printing the second portion of said printing data in said comparison judgment step.

19. The computer readable recording medium as claimed in 18, wherein
in said control step, there is provided control for:
reducing the number of the image forming devices which are the data transfer destinations from the first data transfer device in order to secure a image forming device to which no data will be transferred from the first data transfer device;
transferring the first portion of the data judged to cause image deficiency in said comparison judgment step to the second data transfer device; and
transferring the first portion of said printing data from the second data transfer device to the image forming device to which no data will be transferred from said first data transfer device.

20. The computer readable recording medium as claimed in claim 18, said process further comprising:
a second comparison judgment step of judging whether image deficiency will occur in printing the first portion of the data transferred to an image forming device from the second image data transfer device, and
in said control step, reducing the number of the image forming devices which are the data transfer destinations, when it is judged in said second comparison judgment step that image deficiency will occur.

21. The computer readable recording medium as claimed in claim 18, wherein, in the control step, each page of the printing data is determined to be either of a part of the first portion or a part of the second portion; and wherein the arithmetic step and the comparison judgment step are prior to transferring said printing data to said at least one of said image forming devices.

22. A printing method for a printing system having a plurality of image forming devices, comprising:

prior to transferring printing data to the image forming devices, performing an arithmetic step of calculating data storage speed in transferring data from a first data transfer device to the plurality of image forming devices in the printing system, and comparison judgment step of comparing the data transfer speed calculated in said arithmetic step with printing speed at the image forming devices in the system, and judging whether image deficiency will occur in printing data transferred from the first data storage device to the plurality of image forming devices based on the comparison, wherein in said comparison judgment step, a judgment is made that image deficiency will occur in printing when the data transfer speed calculated in said arithmetic step is lower than the printing speed of said plurality of image forming devices; and a control step of providing control for transferring a first portion of said printing data that is less than an entirety of the printing data from a second data storage device to at least one of the image forming device if it is judged in said judgment step that image deficiency will occur in the first portion of said printing data, and transferring a second portion of said printing data that is less than the entirety of the printing data to at least one of the image forming devices from the first data storage device if it is judged in said judgment step that image deficiency will not occur in the second portion of said printing data.

23. The printing method as claimed in claim 22, wherein said control step includes the further step of transferring said first portion of said printing data from the first data storage device to the second data storage device.

24. The printing method as claimed in claim 22, wherein said control step includes the further step of reducing the number of the image forming devices to which the second portion of the data is to be transferred from the first data storage device.

25. The printing method as claimed in claim 24, wherein said control step includes the further step of transferring the first portion of the data from the second data storage device to an image forming device that is vacated by reducing the number of the image forming devices to which the second portion of the data is to be transferred from the first data storage device.

26. The printing method of claim 22, wherein said first and second storage devices are hard disks.

27. The printing method of claim 26, wherein said hard disks are respectively associated with different print servers.

28. The printing method as claimed in claim 22, wherein, in the control step, each page of the printing data is determined to be either of a part of the first portion or a part of the second portion.

29. A printing system comprising a plurality of image forming devices, a first data storage device and a second data storage device, wherein said printing system is equipped with:

an arithmetic unit for calculating data transfer speed in transferring data from the first data storage device to the plurality of image forming devices in the printing system, a comparison judgment unit for comparing the data transfer speed calculated in said arithmetic unit with printing speed at the image forming devices in the system, and for judging whether image deficiency will occur in printing data transferred from the first data storage device to the plurality of image forming devices based on the comparison, wherein in said comparison judgment unit, a judgment is made that image deficiency will occur in printing when the data transfer speed calculated in said arithmetic unit is lower than the printing speed of said plurality of image forming devices; and a control unit for providing control for transferring a first portion of said printing data that is less than an entirety of the printing data to the second data storage device and then to the image forming device from the second data storage device if it is judged that image deficiency will occur in the first portion of said printing data by the judging unit, and transferring a second portion of said printing data that is less than the entirety of the printing data to at least one of the image forming devices from a first data transfer device if it is judged that image deficiency will not occur in the second portion of said printing data by the judging unit.

30. The printing system as claimed in claim 29, wherein said printing system is equipped with plural print servers, and said first data storage device and said second data storage device are provided within different respective servers.

31. The printing system as claimed in claim 29, wherein each page of the printing data is determined to be either of a part of the first portion or a part of the second portion, and wherein the comparison judgment unit judges whether image deficiency will occur in said printing data prior to transferring said printing data to said image forming device.

32. A print server for transferring data to a plurality of image forming devices for printing, comprising:

an arithmetic unit for calculating data transfer speed in transferring data from a first data storage device associated with the print server to the plurality of image forming devices in the printing system, a comparison judgment unit for comparing the data transfer speed calculated in said arithmetic unit with the printing speed at the image forming devices in the system, and for judging whether image deficiency will occur in printing data transferred from the first data storage device associated with said print server to the plurality of image forming devices based on the comparison, wherein in said comparison judgment unit, a judgment is made that image deficiency will occur in printing when the data transfer speed calculated in said arithmetic unit is lower than the printing speed of said plurality of image forming devices; and a control unit for providing control for transferring a first portion of said printing data that is less than an entirety of the printing data from a second data storage device associated with a different print server to the image forming devices if it is judged by the judgment unit that image deficiency will occur in the first portion of the printing data, and transferring a second portion of said printing data that is less than the entirety of the printing data from the first data storage device to the image forming devices if it is judged by the judgment unit that image deficiency will not occur in the second portion of printing data.

33. The print server as claimed in claim 32, wherein said control unit transfers the first portion of the data to the second data storage device.

34. The print server as claimed in claim 33, wherein said control unit provides control for:

reducing the number of image forming devices which are the data transfer destinations of print data retrieved from the first data storage device in order to secure a image forming device to which no data will be transferred from the first data storage device;

transferring the second portion of the data to the second data storage device.

35. The print server as claimed in claim 32, wherein each page of the printing data is determined to be either of a part of the first portion or a part of the second portion, and wherein the comparison judgment unit judges whether image deficiency will occur in said printing data prior to transferring said printing data to said image forming device.

* * * * *